March 26, 1935. C. J. WHITACRE 1,995,697
COMPOSITE BRAKE DRUM AND METHOD OF MAKING THE SAME
Filed April 23, 1932
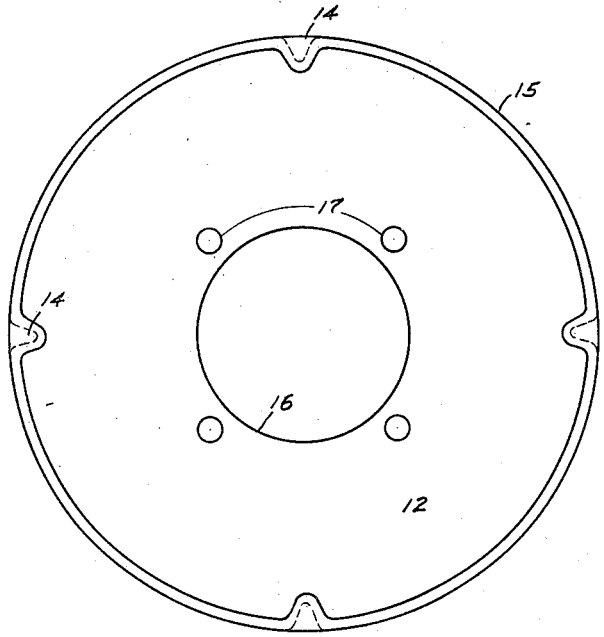
Fig. I
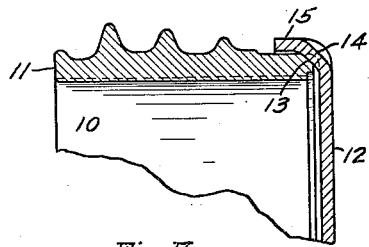
Fig. II
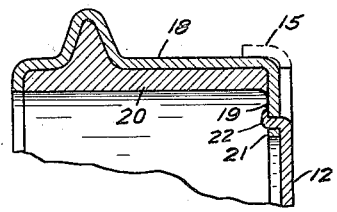
Fig. III
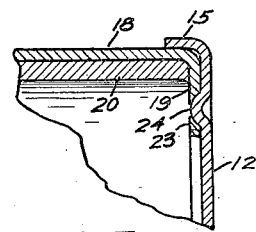
Fig. IV
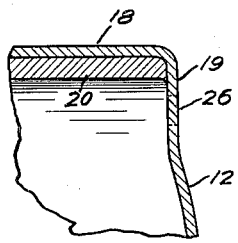
Fig. V
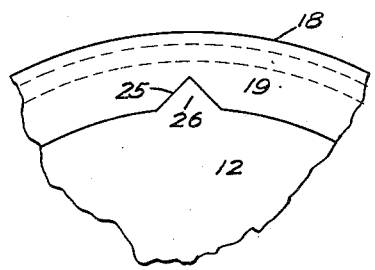
Fig. VI
INVENTOR.
Clarence J. Whitacre.
BY Carroll R. Taber
HIS ATTORNEY.

Patented Mar. 26, 1935

1,995,697

UNITED STATES PATENT OFFICE 1,995,697

COMPOSITE BRAKE DRUM AND METHOD OF MAKING THE SAME

Clarence J. Whitacre, Lansing, Mich., assignor to Motor Wheel Corporation, Lansing, Mich., a corporation of Michigan Application April 23, 1932, Serial No. 607,107

8 Claims. (Cl. 29—152.2)

This invention relates to brake drums and more particularly to composite brake drums and the method of producing the same. The principal object of the invention is the provision of an economical and efficient method of securing a brake drum web to a brake drum ring whereby to form a composite brake drum which will be sufficiently strong to withstand the severe usage to which automotive vehicle brake drums are subjected. Other objects more or less incidental and ancillary to the foregoing will appear in the following description.

Due to the fact that the ring portion of a brake drum serves a different function and is subjected to different stresses and strains than the brake drum web, it has been found desirable to form these parts from metal having different characteristics rather than to form them integrally of the same metal as has been customary heretofore. When the brake ring and brake drum web are formed separately suitable means must be provided for securing these parts together in a manner whereby all possibility of their becoming separated when in use is eliminated.

The present invention provides a method of securing a brake drum web to a brake ring wherein these parts are welded together at a plurality of spaced apart points. In this manner an unusually strong composite brake drum is formed which is of neat appearance and economical construction.

For a better understanding of the invention reference may now be had to the drawing, in which:

Fig. I is a rear view of a brake drum web which may be utilized in practicing the invention;

Fig. II is a partial sectional view through a composite brake drum embodying the brake drum web shown in Fig. I and produced in accordance with the present invention;

Fig. III and Fig. IV are partial sectional views through modified forms of composite brake drum structures produced in accordance with this invention;

Fig. V is a partial sectional view through another modified form of composite brake drum produced in accordance with the present invention; and Fig. VI is a fragmentary rear view of the structure shown in Fig. V.

The composite brake drum 10 shown in Fig. II is produced by securing a brake ring 11 to a brake drum web 12. The ring 11 may be formed from cast metal or by rolling malleable metal into the desired cylindrical formation. At the time the ring 11 is formed it is provided with a plurality of circumferentially spaced apart beveled portions 13 at one edge thereof. The web 12 is formed with a plurality of circumferentially spaced apart projections 14 which are adapted to contact the beveled portions 13 of the ring 11 when these parts are assembled as hereinafter described. The web 12 is preferably provided with a laterally extending peripheral flange 15 and the projections 14 are formed in the web at the inner extremity of the said flange by depressing the metal of the web from the rear side thereof. A suitable central opening 16 is formed in the web whereby the same may be fitted over a conventional vehicle wheel hub member. Likewise, suitable openings 17 are provided adjacent the opening 16 whereby the web 12 may be secured to a vehicle wheel.

The web 12 is secured to the ring 11 by assembling these members as illustrated in Fig. II with the projections 14 of the web 12 contacting the beveled portions 13 of the ring 11 and with the peripheral flange 15 of the web 12 overlying the outer surface of a portion of the ring 11. After the ring 11 and web 12 have been assembled in this manner an electric current is passed through the projections 14 and the beveled portions 13 whereby to weld the web and ring together at these points of contact.

For the purposes of economy of manufacture it is preferred to utilize suitable electrical connections, not shown, whereby welds may be formed at all of the said points of contact between the ring and web simultaneously. Either resistance or projection welding may be employed. It should be understood that the number of beveled portions on the ring and corresponding projections on the web may be varied as desired.

The modified composite drum illustrated in Fig. III comprises a brake drum web 12 secured to a cylindrical brake ring 18 which is preferably formed from sheet metal and provided with an inturned flange 19 at one edge thereof. A wear-resisting inner liner 20 of any suitable material such as cast metal may be secured to the inner surface of the ring 18. The inner edge of the inturned flange 19 is cut away as indicated at 21 at a plurality of circumferentially spaced apart intervals.

The brake drum web to which the ring 18 is secured preferably terminates adjacent the outer surface of the brake ring 18 but may be provided, if desired, with a laterally extending peripheral flange 15 as shown in dotted lines in Fig. III. A plurality of tongue-like projections 22 are cut out of and bent away from the web 12 adjacent the periphery thereof. The tongue-like projections 22 are suitably spaced circumferentially about the web and are of a suitable size so that they will extend within the recesses 21 and will contact the walls thereof when assembled as shown in Fig. III.

After the ring 18 and web 12 have been assembled with the tongue-like projections 22 of the latter positioned within the recesses 21 of the former an electric current is passed through the projections and the portions of the flange 19 adjacent the recesses 21 by any suitable means, not shown, whereby to weld the tongue-like projections 22 to the walls of the recesses 21 and the adjacent surface of flange 19. The projections 22 are formed to provide a surplus of metal to effect the weld by the well known process of resistance welding.

The composite brake drum shown in Fig. IV comprises a brake drum web 12 secured to a cylindrical brake ring 18 which has an inturned flange 19 at one edge thereof and is provided with a wear-resisting liner 20. A plurality of circumferentially spaced apart openings 23 are formed in the flange 19. The brake drum web 12 is formed with a laterally extending peripheral flange 15 and a plurality of bubble-like projections 24 adapted to fit into the openings 23 in the flange 19 when the ring 18 and web 12 are assembled as shown in Fig. IV. After the web and ring have been assembled with the flange 15 encircling a portion of the ring 18 and the projections 24 of the web extending into the openings 23 in the flange 19, an electric current is passed through the projections 24 and the portions of the ring flange 19 adjacent the openings 23 by any suitable means, not shown, whereby to weld the projections 24 to the said portions of the ring flange 19. The well known process of resistance welding is preferably employed for this purpose.

The composite brake drum illustrated in Fig. V comprises a brake drum web 12 secured to the inturned flange 19 of the cylindrical brake ring 18 which may be provided with a wear-resisting inner liner 20. As best shown in Fig. VI the inturned flange 19 is formed with a plurality of circumferentially spaced apart recessed portions 25 and the periphery of the web 12 is provided with a plurality of circumferentially spaced apart radially extending projections 26 of suitable size to fit within the recesses 25 and to engage the walls thereof. The web 12 is secured to the ring 18 by assembling these parts with the projections 26 of the latter extending into the recesses 25 in the flange 19 of the former whereupon an electric current is passed through the projections 26 and the portions of the ring flange 19 adjacent the recesses 25 by any suitable means, not shown, whereby to weld the contacting portions of the said projections and the ring flange together. Resistance welding is preferably employed in this instance also.

While only the preferred methods of practicing the present invention have been shown and described it should be understood that the invention is not limited thereto but is coextensive with the scope of the appended claims.

What is claimed is:

1. A composite brake drum comprising a brake ring having an inturned flange at one edge thereof, said flange being provided with a plurality of circumferentially spaced apart recesses at its inner extremity, and a brake drum web having a plurality of circumferentially spaced apart integral tonguelike projections adjacent the periphery thereof, said tonguelike projections being disposed within and welded to the surfaces defining the said recesses whereby to secure the ring and web together.

2. A composite brake drum comprising a brake ring having an inturned flange at one edge thereof, said flange being provided with a plurality of circumferentially spaced apart openings therein, and a brake drum web having a plurality of circumferentially spaced apart projections adjacent the periphery thereof, said projections being disposed within and welded to the surfaces defining said openings whereby to secure the ring and web together.

3. A composite brake drum comprising a brake ring having an inturned flange at one edge thereof, said flange being provided with a plurality of circumferentially spaced apart openings therein, and a brake drum web having a laterally extending peripheral flange and provided with a plurality of circumferentially spaced apart integral projections adjacent said flange, said ring and web arranged with the peripheral flange of the latter encircling one edge of the former and with the integral projections of the latter disposed within and welded to the surfaces defining the openings in the flange thereof whereby to secure the ring and web together.

4. A composite brake drum comprising a brake ring having an inturned flange at one edge thereof, said flange being provided with a plurality of circumferentially spaced apart recesses at the inner edge thereof, and a substantially flat brake drum web of generally circular formation having a plurality of circumferentially spaced apart integral radially extending projections at the periphery thereof, said projections being disposed within and welded to the surfaces defining the recesses in the said flange whereby to secure the ring and web together.

5. The method of forming a composite brake drum which comprises providing a brake ring having an inturned flange at one end, forming a plurality of circumferentially spaced apart openings in said ring flange, providing a brake drum web having a peripheral flange, forming a plurality of circumferential spaced apart integral projections in the web, assembling the ring and web in concentric relation with the peripheral flange of the latter encircling the former and with the said projections positioned within the openings in the ring flange, and welding said projections to the ring flange.

6. The method of forming a composite brake drum which comprises providing a brake ring having an inturned flange at one end thereof, forming a plurality of circumferentially spaced apart radially extending openings in the inner edge of said flange, providing a brake drum web having a plurality of integral projections adapted to extend into said openings, assembling the ring and web in concentric relation with the projections of the latter extending into the opening of the former, and welding said projections to the ring flange.

7. The method of forming a composite brake drum which comprises providing a brake ring with an inturned flange at one end thereof, forming a plurality of circumferentially spaced apart radially extending openings in the inner edge of said flange, providing a brake drum web having a plurality of circumferentially spaced radially extending integral projections at its periphery, assembling the ring and web in concentric relation with the integral projections of the latter extending into the openings in the ring flange, and welding said projections to the ring flange.

8. The method of forming a composite brake drum which comprises providing a brake ring having an inturned flange at one end thereof, forming a plurality of circumferentially spaced apart radially extending openings at the inner extremity of said flange, providing a brake drum web having a plurality of circumferentially spaced apart axially extending integral projections inwardly of its periphery, assembling said ring and web in concentric relation with the projections of the latter extending into said openings and with the body of the latter outwardly of said projections contacting the ring flange, and welding said web projections to the ring flange.

CLARENCE J. WHITACRE.